US012583217B2

(12) United States Patent
Takatsu et al.

(10) Patent No.: US 12,583,217 B2
(45) Date of Patent: Mar. 24, 2026

(54) CALIBRATION METHOD

(71) Applicant: SEIKO EPSON CORPORATION, Tokyo (JP)

(72) Inventors: Naoki Takatsu, Suwa (JP); Hiromu Miyazawa, Azumino (JP); Satoru Masai, Ina (JP); Oshi Iwakami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 171 days.

(21) Appl. No.: 18/452,735

(22) Filed: Aug. 21, 2023

(65) Prior Publication Data

US 2024/0066858 A1 Feb. 29, 2024

(30) Foreign Application Priority Data

Aug. 24, 2022 (JP) ................................ 2022-133564

(51) Int. Cl.
*B41J 2/045* (2006.01)

(52) U.S. Cl.
CPC ................................ *B41J 2/04508* (2013.01)

(58) Field of Classification Search
CPC ............ B41J 2/04508; B41J 2029/3935; B41J 11/009; B41J 2202/21; G06K 15/027
See application file for complete search history.

(56) References Cited

U.S. PATENT DOCUMENTS

2007/0046707 A1* 3/2007 Sakakibara .......... H04N 1/6094 347/14
2018/0267748 A1* 9/2018 Takizawa ........... H04N 1/00909

FOREIGN PATENT DOCUMENTS

JP 2014-050968 A 3/2014

* cited by examiner

*Primary Examiner* — Thinh H Nguyen
(74) *Attorney, Agent, or Firm* — WORKMAN NYDEGGER

(57) ABSTRACT

A calibration method includes acquiring medium information; specifying a type of medium by collating medium information with structure data; executing a first simulation of ejecting liquid by changing at least one of physical property conditions at least once for a structure model corresponding to a specified type of the medium; ejecting the liquid onto the medium; acquiring permeation information of the liquid ejected to the medium; estimating a physical property condition of the liquid by collating the permeation information with results of the first simulation; executing a second simulation of ejecting the liquid by changing at least one of ejection conditions at least once based on the estimated physical property condition; and displaying a plurality of virtual print results, which are virtual print results when printing is performed on the medium based on each of the ejection conditions, based on results of the second simulation.

7 Claims, 6 Drawing Sheets

CALIBRATION METHOD

The present application is based on, and claims priority from JP Application Serial Number 2022-133564, filed Aug. 24, 2022, the disclosure of which is hereby incorporated by reference herein in its entirety.

BACKGROUND

1. Technical Field

The present disclosure relates to a calibration method.

2. Related Art

For example, such as in JP-A-2014-050968, there is a calibration method of a printing device that performs printing by supplying ink, which is an example of liquid, to a print medium, which is an example of a medium. A printing device includes a printing device main body and a calibration section. The printing device main body performs inspection printing by changing permeation factors affecting the permeation of ink. The calibration section calculates a correction value from the print medium on which the inspection printing has been performed, and corrects printing conditions based on the correction value to calibrate the printing device.

In a case where printing is performed on various types of medium, inspection printing needs to be performed every time a medium is changed in the printing device in a JP-A-2014-050968. Therefore, it takes a lot of time and effort to perform a calibration.

SUMMARY

A calibration method for overcoming the above-described problem includes acquiring medium information relating to a medium on which printing of an image is to be executed by liquid ejected in a droplet state; specifying a type of the medium by collating the acquired medium information with structure data, the structure data being data relating to structure models of the medium corresponding to each of a plurality of types of the medium; executing a first simulation of changing, at least once, at least one physical property condition of a plurality of physical property conditions, which are conditions relating to a physical property of the liquid, and ejecting the liquid with respect to the structure model corresponding to type of the specified medium; ejecting the liquid onto the medium; acquiring permeation information relating to permeation state of the liquid ejected onto the medium; estimating the physical property condition of the liquid by collating the acquired permeation information with results of the first simulation; executing, based on the estimated physical property condition, a second simulation of changing, at least once, at least one ejection condition of ejection conditions relating to ejection of the liquid, and ejecting the liquid; and displaying, based on results of the second simulation, a plurality of virtual print results, which are virtual print results when printing is performed on the medium based on each of the ejection conditions.

DESCRIPTION OF EMBODIMENTS

Hereinafter, an embodiment of a calibration method will be described with reference to the drawings. The calibration method is implemented in a printing system.

Printing System

Figure 1:
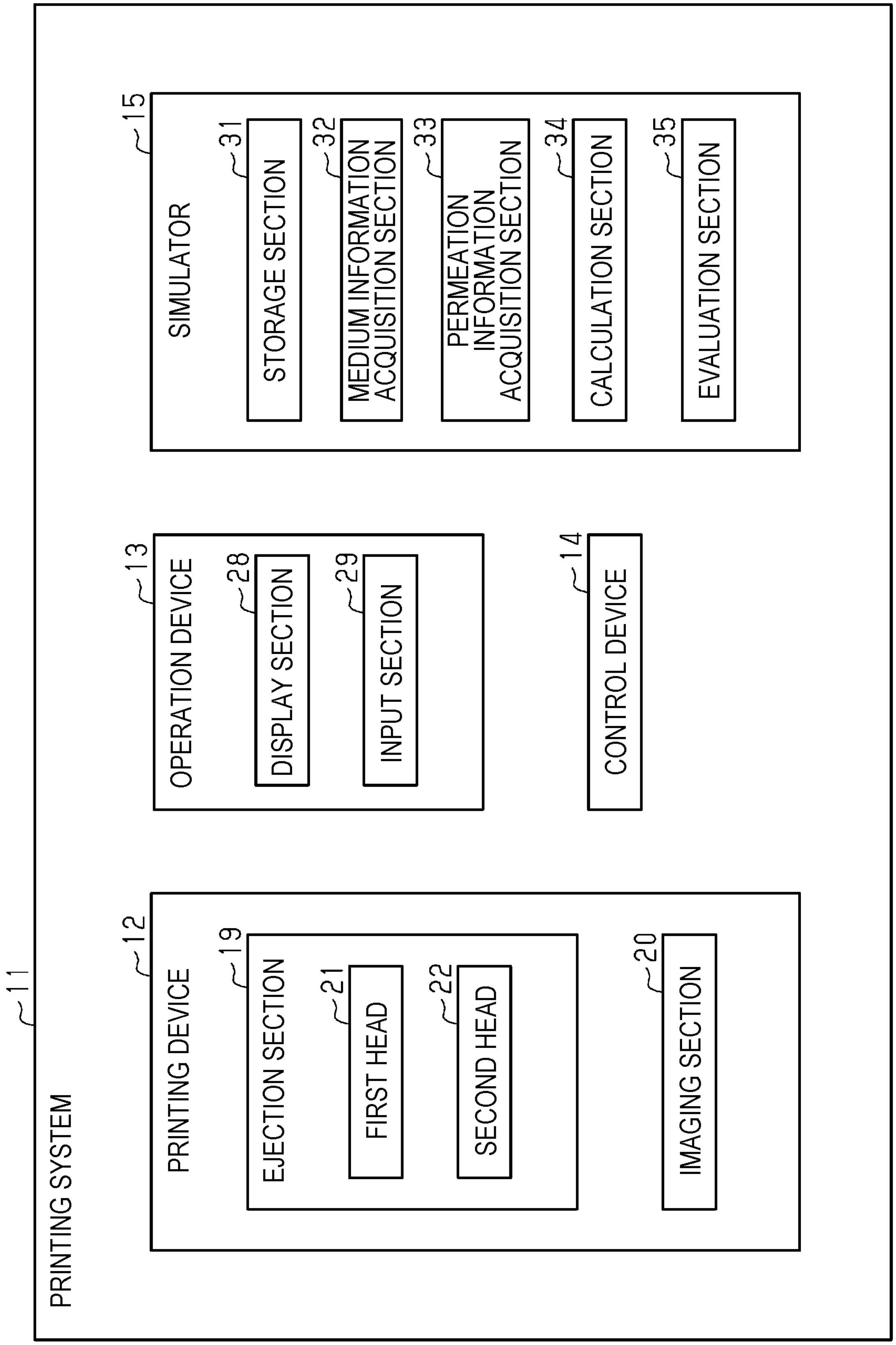
FIG. 1 is a block diagram of a printing system.

As shown in FIG. 1, a printing system 11 may include at least one printing device 12, an operation device 13, a control device 14, and a simulator 15.

Figure 2:
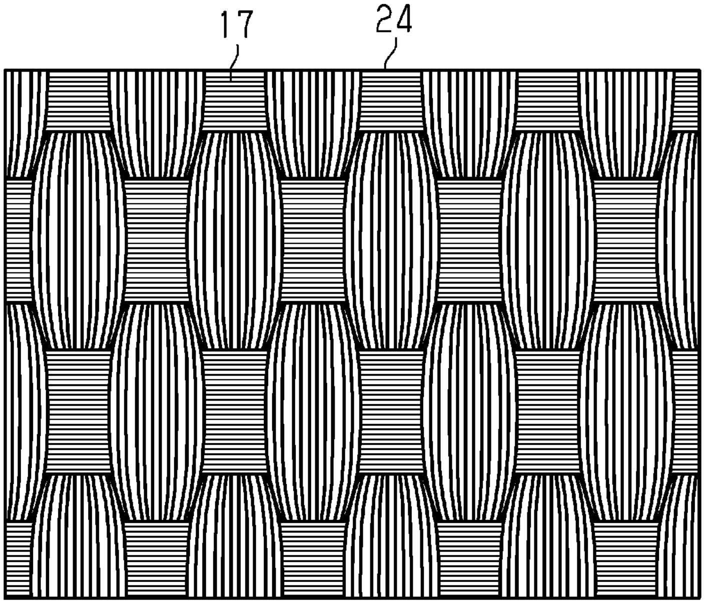
FIG. 2 is a schematic diagram showing a prior image.

The printing device 12 of the present embodiment is an inkjet type printer that prints an image such as a character and a photograph by ejecting ink, which is an example of liquid, onto a medium 17 shown in FIG. 2, such as a fabric.

The printing device 12 may include an ejection section 19 and an imaging section 20. The ejection section 19 may include a first head 21 and a second head 22. Each of the first head 21 and the second head 22 can eject liquid from a plurality of nozzles (not shown). The first head 21 and the second head 22 may have the same configuration or different configurations. The first head 21 and the second head 22 may be serial heads that scan across the medium 17. The first head 21 and the second head 22 may be line heads that eject liquid in a stopped state with respect to the medium 17 that is transported. The ejection section 19 prints an image on the medium 17 with liquid ejected in a droplet state.

The imaging section 20 is, for example, an X-ray CT device, a camera capable of taking a microscopic photograph, or the like. The imaging section 20 may be capable of imaging the medium 17 before liquid is deposited and the medium 17 after droplets are deposited.

As shown in FIG. 2, the imaging section 20 may output a prior image 24 obtained by imaging the medium 17 before liquid is deposited. The prior image 24 may be an image of a portion to which liquid is not deposited on the medium 17 to which liquid was deposited.

Figure 3:
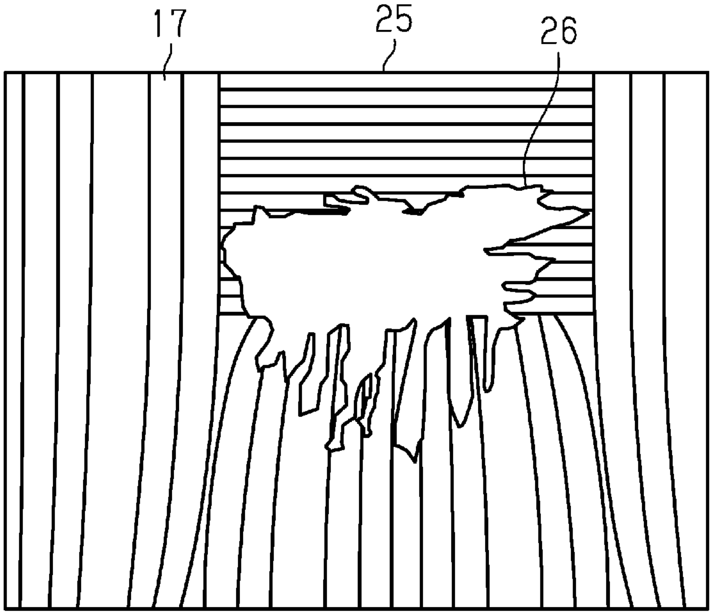
FIG. 3 is a schematic diagram showing a post image.

As shown in FIG. 3, the imaging section 20 may output a post image 25 obtained by imaging the medium 17 after liquid is deposited. The post image 25 includes a liquid trace 26 which is a trace formed when the droplets deposited to the medium 17 permeate into the medium 17.

The prior image 24 and the post image 25 may be images captured at the same magnification or may be images captured at different magnifications. The printing device 12 may include a plurality of imaging sections 20. For example, the printing device 12 may separately include the imaging section 20 that images the medium 17 before liquid is deposited and the imaging section 20 that images the medium 17 after liquid is deposited.

As shown in FIG. 1, the operation device 13 may include a display section 28 and an input section 29. The display section 28 and the input section 29 may be an integrally formed touch panel. A user may operate the printing system 11 via the operation device 13.

The display section 28 displays information. The display section 28 is, for example, a liquid crystal display. The display section 28 notifies a user by displaying various kinds of information.

The input section 29 may include, for example, at least one of a keyboard, a mouse, a button, a connector, and a wireless receiving unit. A user may select a display mode to be displayed on the display section 28 via the input section 29. A user may input target image data that is data of a target image via the input section 29. The target image data includes various kinds of information for defining the target image, such as information relating to the degree of bleeding of liquid in the medium 17 and information relating to the shape of the image formed on the medium 17. The various types of information may be defined by numerical parameters.

The control device 14 integrally controls each mechanism in the printing system 11, and controls various operations executed in the printing system 11. The control device 14 may be provided in one of the printing device 12, the operation device 13, and the simulator 15, or may be provided in a plurality of divided functions, for example. The control device 14 may be provided separately from the printing device 12, the operation device 13, and the simulator 15.

The control device 14 can be configured as a circuit including a: one or more processors which execute various processes according to a computer program, one or more dedicated hardware circuits which execute at least some of various processes, or y: a combination thereof. The hardware circuit is, for example, an application specific integrated circuit. The processor includes a CPU and memory, such as RAM and ROM, which stores program code or instructions configured to cause the CPU to perform processing. The memory, that is, the computer-readable medium, includes any readable medium that can be accessed by a general purpose or special purpose computer.

The simulator 15 may include a storage section 31, a medium information acquisition section 32, a permeation information acquisition section 33, a calculation section 34, and an evaluation section 35. The medium information acquisition section 32, the permeation information acquisition section 33, the calculation section 34, and the evaluation section 35 may be realized by a computer (not shown) executing a program.

The storage section 31 is, for example, a nonvolatile memory. The storage section 31 may store structure data. The structure data is data relating to a structure model of the medium 17 corresponding to each of the plurality of types of the medium 17. The structure model is obtained by measuring each of the plurality of types of medium 17 in advance using a technique such as X-ray CT. The structure model is a three dimensional model. A type of the medium 17 is defined by at least one of a type (material) of a thread, a thickness of a thread, the number of threads, a density of a thread, a strength of a twist, a way of a weave, and a density of a weave.

The medium information acquisition section 32 acquires medium information relating to the medium 17. The medium information may be the prior image 24. The medium information may include information obtained by analyzing the prior image 24. For example, the medium information acquisition section 32 may include at least one of the type (material) of a thread constituting the medium 17, a thickness of a thread, the number of threads, a density of a thread, a strength of a twist, a way of a weave, and a density of a weave.

The permeation information acquisition section 33 acquires permeation information. The permeation information is information relating to the permeation state of liquid ejected onto the medium 17. The permeation information is information for the simulator 15 to grasp the degree of bleeding of the liquid ejected onto the medium 17. The permeation information may be the post image 25. The permeation information may include information obtained by analyzing the post image 25. For example, the permeation information may include at least one of a size of the liquid trace 26, a shape of the liquid trace 26, and a depth of the liquid trace 26.

The calculation section 34 executes a first simulation about the structure model. The calculation section 34 executes a second simulation based on results of the first simulation. The calculation section 34 calculates a virtual print result 37 shown in FIG. 4, which is a virtual print result in a case where printing is performed on the medium 17 based on each ejection condition based on results of the second simulation.

The evaluation section 35 may compare a plurality of virtual print results 37 with the target image data. The evaluation section 35 may evaluate a difference between the plurality of virtual print results 37 and the target image data.

Figure 4:
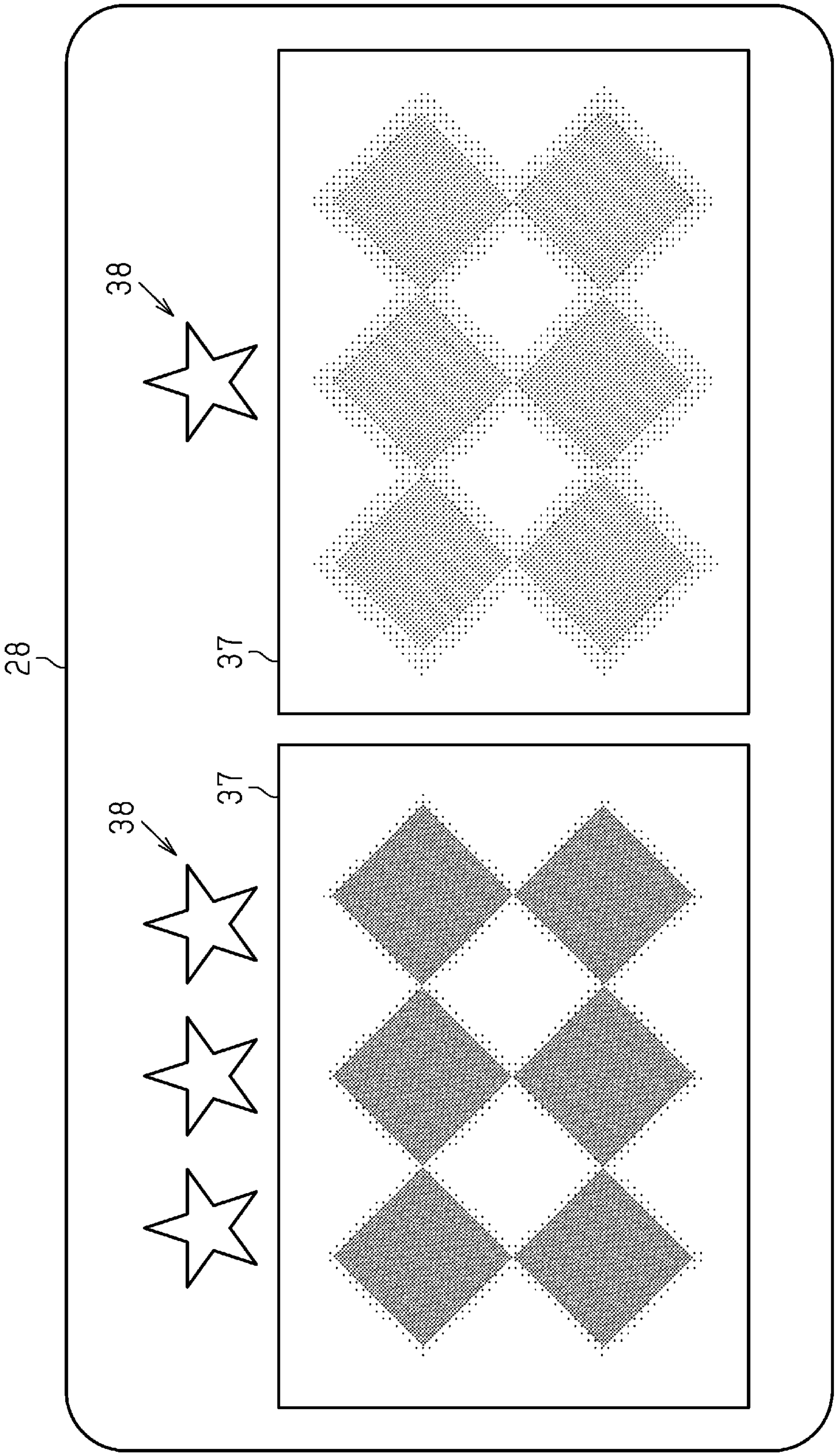
FIG. 4 is a schematic diagram showing a virtual print result displayed on a display section.

As shown in FIG. 4, the printing system 11 displays the plurality of virtual print results 37 on the display section 28 based on the results of the second simulation. The printing system 11 may arrange and display the plurality of virtual print results 37 in order of closeness to the target image data on the basis of the collation results between the target image data and the plurality of virtual print results 37. The printing system 11 may display an evaluation index 38 based on a difference between the target image data and each of the plurality of virtual print results 37 in association with each of the plurality of virtual print results 37. The evaluation index 38 may be expressed by, for example, a number of marks or a numerical value such as a matching rate.

First Simulation

Figure 5:
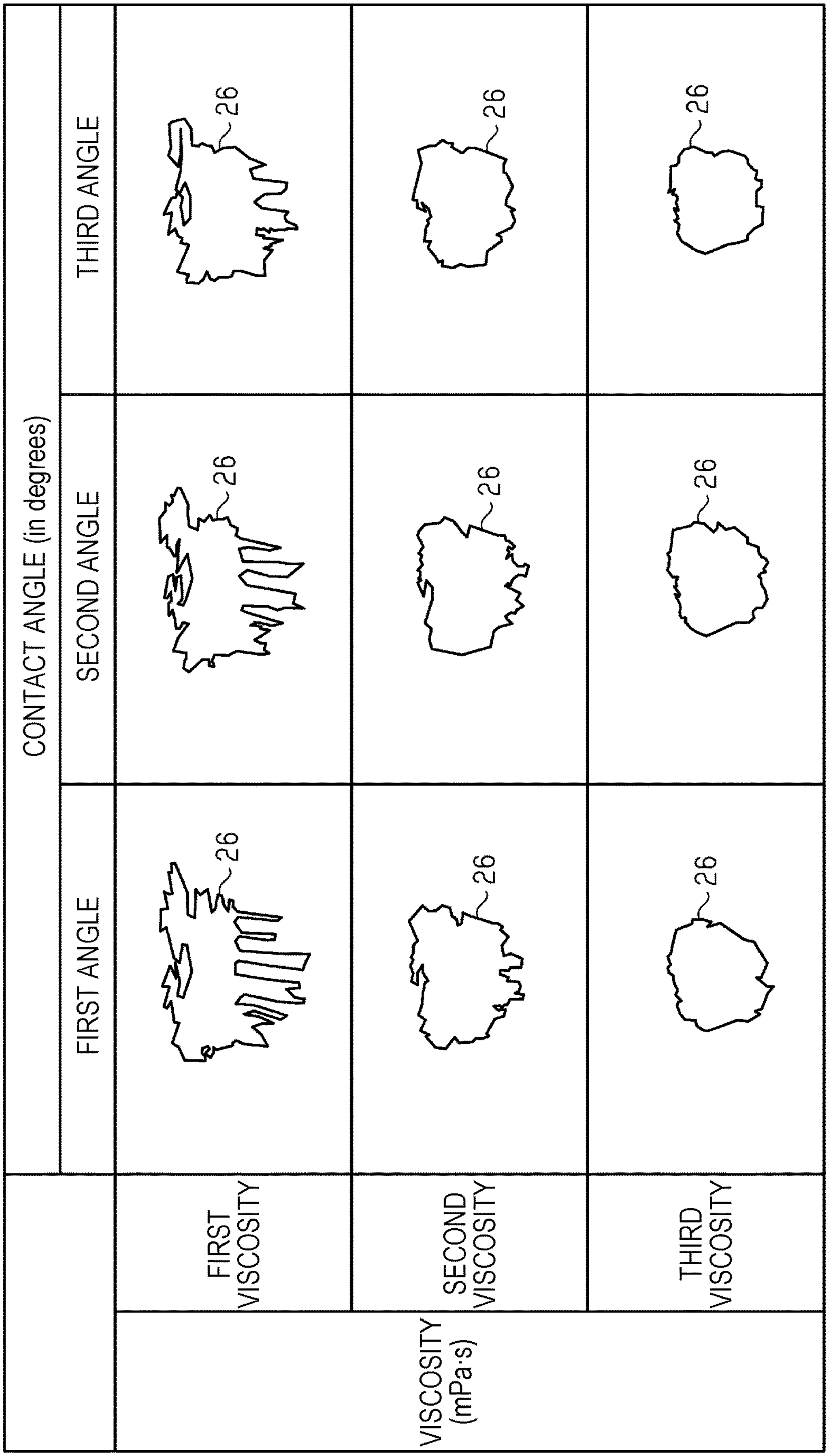
FIG. 5 is a schematic diagram showing results of a first simulation.

As shown in FIG. 5, the calculation section 34 estimates the liquid trace 26 formed on the medium 17 by performing the first simulation. The first simulation is a fluid simulation. The first simulation is performed on the assumption that droplets where deposited on the structure model of the medium 17. The fluidity of the liquid varies depending on its physical property condition. That is, the degree of bleeding of the liquid in the medium 17 varies depending on its physical property condition. Therefore, in the first simulation, in order to calculate a change in the degree of bleeding due to a change in the physical property condition of the liquid, the liquid is ejected to the structure model of the medium 17 while changing the physical property condition of the liquid in a plurality of ways, and the liquid trace 26 estimated based on each physical property condition is output in association with each physical property condition. The physical property condition is a condition relating to a physical property of the liquid. The physical property condition may include at least one of pH, which is the hydrogen ion concentration of the liquid, a viscosity property of the liquid, a contact angle of the liquid with respect to the medium 17, and a surface tension of the liquid. For example, in the first simulation, the liquid trace 26 in a case where the contact angle of the liquid with respect to the medium 17 is a first contact angle and the liquid trace 26 in a case where the contact angle is changed from the first contact angle to a second contact angle are calculated. That is, in the first simulation, at least one of the physical property conditions is changed at least once.

FIG. 5 shows results obtained when the first simulation is executed while changing a viscosity and the contact angle of the assumed liquid. A second viscosity is greater than a first viscosity and less than a third viscosity. For example, the first viscosity is 1 mPa s, the second viscosity is 5 mPa s, and the third viscosity is 10 mPa s. A second angle is greater than a first angle and less than a third angle. For example, the first angle is 10°, the second angle is 30°, and the third angle is 60°. It is presumed that the lower the viscosity, then the more likely the liquid trace 26 is to spread along the threads constituting the medium 17. It is presumed that the smaller that the viscosity and the contact angle of the liquid are, the larger the liquid trace 26 will become. It is presumed that the larger the viscosity and the contact angle are, the smaller the liquid trace 26 will become.

Second Simulation

Figure 6:
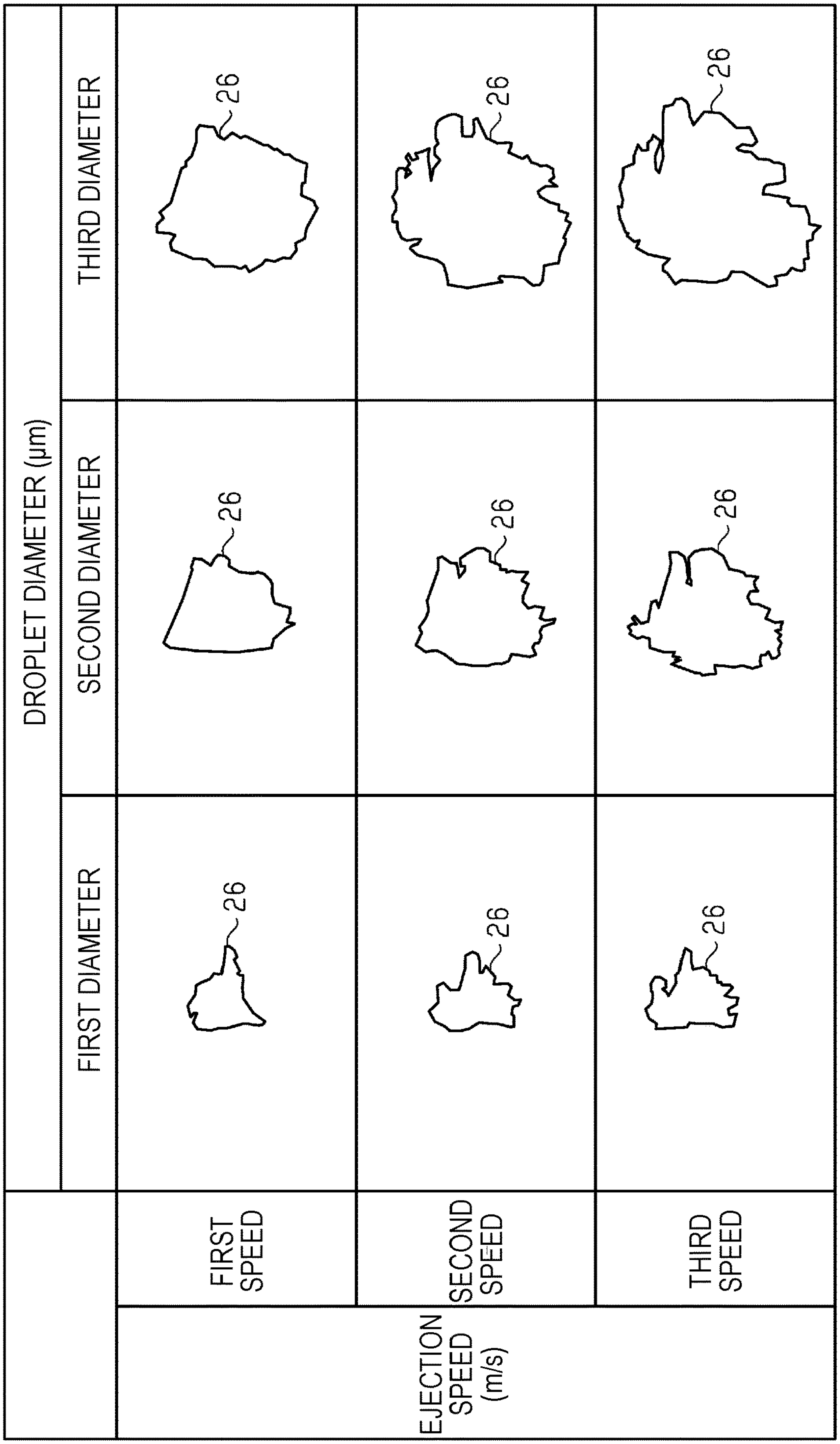
FIG. 6 is a schematic diagram showing results of a second simulation.

As shown in FIG. 6, the calculation section 34 estimates the liquid trace 26 formed on the medium 17 by performing the second simulation. The second simulation is a fluid simulation. The second simulation is performed on the assumption that the liquid is ejected to the structure model of the medium 17. In the second simulation, in order to calculate a change in the degree of bleeding due to a change in the ejection condition of the liquid, the liquid is ejected to the structure model of the medium 17 while changing the ejection condition in a plurality of ways, and the liquid trace 26 estimated based on each ejection condition is output in association with each ejection condition. The ejection condition is a condition relating to an ejection of the liquid. The ejection condition may include at least one of a diameter of a droplet, a volume of a droplet, a weight of a droplet, an ejection speed of a droplet, and a deposit pattern. The deposit pattern may include, for example, at least one of an interval between droplets, a degree of overlapping of a plurality of droplets, and a period of time from when a previously ejected droplet lands on the medium 17 to when a next ejected droplet lands to the medium 17. For example, in the second simulation, the liquid trace 26 in a case where the droplet ejection speed to the medium 17 is a first ejection speed and the liquid trace 26 in a case where the ejection speed is changed from the first ejection speed to a second ejection speed are calculated. That is, in the second simulation, at least one of the ejection conditions is changed at least once.

FIG. 6 shows results obtained when the second simulation is executed while changing the ejection speed, which is a speed at which the liquid is ejected, and the droplet diameter. A second speed is faster than a first speed and slower than a third speed. For example, the first speed is 3 m/s, the second speed is 9 m/s, and the third speed is 15 m/s. A second diameter is larger than a first diameter and smaller than a third diameter. For example, the first diameter is 20 μm, the second diameter is 30 μm, and the third diameter is 40 μm. It is presumed that the faster the ejection speed, the larger the liquid trace 26 will become. It is presumed that the larger the droplet diameter, the larger the liquid trace 26 will become.

Calibration Method

Next, the calibration method will be described with reference to a flowchart shown in FIG. 7. This calibration routine may be executed by the control device 14 at a timing indicated by a user.

Figure 7:
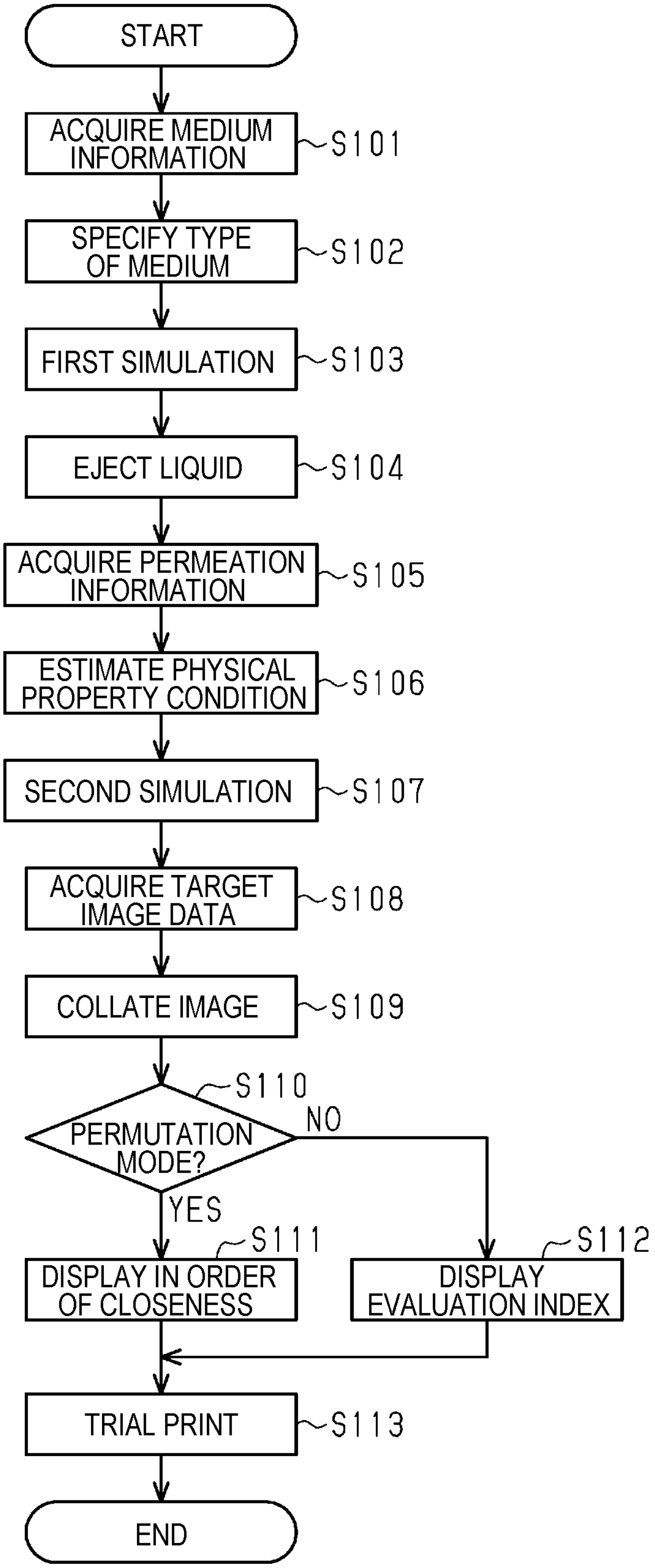
FIG. 7 is a flowchart showing a calibration routine.

As shown in FIG. 7, in step S101, the control device 14 causes the medium information acquisition section 32 to acquire the medium information. In step S102, the control device 14 causes the simulator 15 to specify the type of medium 17. The simulator 15 specifies the type of medium 17 by collating the medium information acquired in step S101 with the structure data.

In step S103, the control device 14 causes the calculation section 34 to execute the first simulation on the structure model corresponding to a specified type of the medium 17. In step S104, the control device 14 drives the ejection section 19 to eject the liquid onto the medium 17. In step S105, the control device 14 causes the imaging section 20 to image the liquid ejected onto the medium 17, and causes the permeation information acquisition section 33 to acquire the permeation information.

In step S106, the control device 14 causes the simulator 15 to estimate the physical property condition. The simulator 15 estimates the physical property condition of the liquid by collating the permeation information (the post image 25) acquired in step S105 with the results of the first simulation. Specifically, the simulator 15 selects a result close to the liquid trace 26 included in the post image 25 from the results of the first simulation. The simulator 15 estimates the physical property condition of the result selected from results of the first simulation as the physical property condition of the liquid.

In step S107, the control device 14 causes the calculation section 34 to execute the second simulation based on the estimated physical property condition. In step S108, the control device 14 may acquire the target image data. In step S109, the control device 14 may cause the evaluation section 35 to collate the target image data with the plurality of virtual print results 37.

In step S110, the control device 14 determines whether a permutation mode or an index mode is selected as a display mode.

When the permutation mode is selected, step S110 becomes YES, and the control device 14 shifts a processing to step S111. In step S111, the control device 14 displays the results by arranging the plurality of virtual print results 37 in order of closeness to the target image data.

When the index mode is selected, step S110 becomes NO, and the control device 14 shifts a processing to step S112. In step S112, the control device 14 causes the evaluation index 38 to be displayed as results associated with each of the plurality of virtual print results 37.

In step S113, the control device 14 may execute a trial print of the virtual print result 37 selected by a user. When a user selects a plurality of virtual print results 37, the plurality of virtual print results 37 may be printed in parallel. Specifically, the plurality of virtual print results 37 may include a first virtual print result and a second virtual print result. The control device 14 may print on the medium 17 based on a second ejection condition corresponding to the second virtual print result while printing on the medium 17 based on a first ejection condition corresponding to the first virtual print result. For example, the control device 14 may cause the first head 21 to print the first virtual printing result and cause the second head 22 to print the second virtual printing result.

Operations of Embodiment

The operations of present embodiment will be described.

The printing system 11 estimates the physical property condition of the liquid by comparing the actual liquid trace 26 in which the ejection section 19 ejects the liquid with the results of the first simulation. The printing system 11 executes the second simulation based on the estimated physical property condition, and displays the plurality of virtual print results 37 based on the results of the second simulation.

Effects of Embodiment

The effects of present embodiment will be described.

(1) The type of the medium 17 can be specified by collating the medium information with the structure data. The physical property condition of the liquid can be estimated by collating the results of the first simulation with the permeation information. The second simulation predicts print results for when printing is performed on the medium 17 under the plurality of ejection conditions. That is, it is possible to virtually perform the calibration related to the ejection condition of the liquid instead of by actual printing. Therefore, labor required for calibration can be reduced.

(2) The plurality of virtual print results 37 are displayed side by side in order of closeness to the target image data. Therefore, a user can easily grasp the recommended order of the plurality of virtual print results 37. (3) The plurality of virtual print results 37 are displayed in association with the evaluation index 38. The evaluation index 38 indicates a difference between each of the plurality of virtual printing results 37 and the target image data. Therefore, a user can easily grasp the recommended virtual print result 37.

(4) The viscosity property of the liquid, the contact angle of the liquid with respect to the medium 17, and the surface tension of the liquid may affect print quality. The physical property condition includes at least one of viscosity property of the liquid, contact angle of the liquid with respect to the medium 17, and surface tension of the liquid. Therefore, accuracy of the first simulation executed while changing the physical property condition and accuracy of the second simulation executed based on results of the first simulation can be improved.

(5) Droplet diameter, droplet volume, droplet weight, droplet ejection speed, and deposit pattern may affect print quality. The ejection condition includes at least one of droplet diameter, droplet volume, droplet weight, droplet ejection speed, and deposit pattern. Therefore, accuracy of the second simulation executed while changing the ejection condition can be improved.

(6) Printing based on the second ejection condition is performed while performing printing based on the first ejection condition. Therefore, the time required for printing can be shortened compared with when printing based on the second ejection condition is performed after printing based on the first ejection condition is completed.

Modifications

The present embodiment can be modified as follows. The present embodiment and the following modifications can be implemented in combination with each other within a range that is not technically contradictory.

The display section 28 may display one virtual print result 37 out of a plurality of virtual print results 37. The virtual print result 37 displayed on the display section 28 may be replaced based on an instruction input by the input section 29, for example. The number of virtual print results 37 displayed on the display section 28 may be changeable.

In a case where a user selects the plurality of virtual print results 37 for the trial print, the control device 14 may sequentially print the plurality of virtual print results 37 instead of printing the plurality of virtual print results 37 in parallel.

In a case where a user causes a plurality of virtual print results 37 to be printed in parallel, each of the plurality of printing devices 12 may be caused to print each of the plurality of virtual print results 37 in parallel.

The second simulation may be executed by changing all of the droplet diameter, droplet volume, droplet weight, the droplet ejection speed, and deposit pattern. The ejection condition to be changed may be selected in accordance with the physical property condition of the liquid, for example.

The first simulation may be executed by changing all of viscosity property of the liquid, contact angle of the liquid with respect to the medium 17, and surface tension of the liquid. The first simulation may be executed by changing one or two of the viscosity property of the liquid, contact angle of the liquid with respect to the medium 17, and surface tension of the liquid.

The control device 14 may arrange the plurality of virtual print results 37 in order of closeness to the target image data, and may display each virtual printing result 37 in association with the evaluation index 38.

The control device 14 may display the plurality of virtual print results 37 in a calculated order.

The simulator 15 may create structure data from the medium information. The simulator 15 may create structure data when the structure data stored in the storage section 31 does not match the medium information. The simulator 15 may create structure data each time medium information is acquired. In this case, the storage section 31 may not store structure data.

The simulator 15 may compare the permeation information with the results of the first simulation and execute the first simulation again based on results of the comparison. The simulator 15 may repeatedly execute the first simulation while adjusting the physical property condition so that results of the first simulation approach the permeation information.

The simulator 15 may execute the first simulation before specifying the type of the medium 17. The simulator 15 may execute the first simulation in advance. The storage section 31 may store the results of the first simulation. The simulator 15 may include a database containing the results of the first simulation. The simulator 15 may estimate the physical property condition of the liquid by collating the permeation information with the database. By creating the database of the first simulation in advance, the time required for calibration can be shortened.

The simulator 15 may execute the second simulation in advance. The storage section 31 may store the results of the second simulation. The simulator 15 may include a database containing the results of the second simulation. The simulator 15 may create the virtual print result 37 using the database. By creating the database of the second simulation in advance, the time required for calibration can be shortened.

The medium information acquisition section 32 may acquire the medium information input to the input section 29. A user may input the medium information through the input section 29. The medium information acquisition section 32 may acquire medium information from at least one of the input section 29 and the imaging section 20.

The printing system 11 may include a plurality of printing devices 12. The first virtual print result and the second virtual print result may be printed by different printing devices 12.

The medium 17 three dimensionally diffuses the deposited liquid, and may be, for example, a woven fabric, a knitted fabric, paper, a film, or a nonwoven fabric. The medium 17 may be a powder. The liquid may be a binder agent that is added to the powder.

The liquid can be arbitrarily selected as long as the liquid can be printed on the medium 17 by depositing to the medium 17. For example, the liquid can be any substance when in its liquid phase, and includes a fluid body such as a liquid body having high or low viscosity property, sol, gel water, other inorganic solvents, organic solvents, solutions, liquid resins, liquid metals, and metal melts. The liquid includes not only a liquid as one state of a substance but also a substance in which particles of a functional material composed of a solid such as a pigment or metal particles are dissolved, dispersed, or mixed in a solvent. Typical examples of liquid include ink and liquid crystal. Ink includes general water-based ink, oil-based ink, and various liquid compositions such as gel ink and hot melt ink.

Definitions

The expression "at least one" as used herein means "one or more" of the desired alternatives. As an example, the expression "at least one" as used herein means "only one option" or "both of two options" if the number of options is two. As another example, the expression "at least one" as used herein means "only one option" or "any combination of two or more options" if the number of options is three or more.

Note

Hereinafter, technical ideas grasped from the above-described embodiment and modifications, and operations and effects thereof, will be described.

(A) A calibration method includes acquiring medium information relating to a medium on which printing of an image is to be executed by liquid ejected in a droplet state; specifying a type of the medium by collating the acquired medium information with structure data, the structure data being data relating to structure models of the medium corresponding to each of a plurality of types of the medium; executing a first simulation of changing, at least once, at least one physical property condition of a plurality of physical property conditions, which are conditions relating to a physical property of the liquid, and ejecting the liquid with respect to the structure model corresponding to type of the specified medium; ejecting the liquid onto the medium; acquiring permeation information relating to permeation state of the liquid ejected onto the medium; estimating the physical property condition of the liquid by collating the acquired permeation information with results of the first simulation; executing, based on the estimated physical property condition, a second simulation of changing, at least once, at least one ejection condition of ejection conditions relating to ejection of the liquid, and ejecting the liquid; and displaying, based on results of the second simulation, a plurality of virtual print results, which are virtual print results when printing is performed on the medium based on each of the ejection conditions.

According to this method, the type of the medium can be specified by collating the medium information with the structure data. The physical property condition of the liquid can be estimated by collating the results of the first simulation with the permeation information. The second simulation predicts a print result in a case where printing is performed on the medium under the plurality of ejection conditions. That is, it is possible to virtually perform the calibration related to the ejection condition of the liquid instead of by actual printing. Therefore, labor required for calibration can be reduced.

(B) A calibration method may include acquiring target image data, which is data of a target image; collating the target image data with the plurality of virtual print results; and based on collation results between the target image data and the plurality of virtual print results, displaying the plurality of virtual print results in order of closeness to the target image data.

According to this method, the plurality of virtual print results are displayed side by side in order of closeness to the target image data. Therefore, a user can easily grasp the recommended order of the plurality of virtual print results.

(C) A calibration method may include acquiring target image data, which is data of a target image; collating the target image data with the plurality of virtual print results; and displaying an evaluation index based on a difference between the target image data and each of the plurality of virtual print results in association with each of the plurality of virtual print results.

According to this method, the plurality of virtual print results are displayed in association with the evaluation index. The evaluation index indicates a difference between each of the plurality of virtual printing results and the target image data. Therefore, a user can easily grasp the recommended virtual print result.

(D) In a calibration method, the physical property condition may include at least one of a viscosity property of the liquid, a contact angle of the liquid with respect to the medium, and a surface tension of the liquid.

The viscosity property of the liquid, the contact angle of the liquid to the medium, and the surface tension of the liquid can affect print quality. According to this method, the physical property condition include at least one of the viscosity property of the liquid, the contact angle of the liquid with respect to the medium, and the surface tension of the liquid. Therefore, accuracy of the first simulation executed while changing the physical property condition and accuracy of the second simulation executed based on results of the first simulation can be improved.

(E) In a calibration method, the ejection condition may include at least one of droplet diameter, droplet volume, droplet weight, droplet ejection speed, and deposit pattern.

The droplet diameter, the droplet volume, the droplet weight, the droplet ejection speed, and the deposit pattern can affect print quality. According to this method, the ejection condition include at least one of the droplet diameter, the droplet volume, the droplet weight, the droplet ejection speed, and the deposit pattern. Therefore, accuracy of the second simulation executed while changing the ejection condition can be improved.

(F) In a calibration method, the plurality of virtual print result may include a first virtual print result and a second virtual print result and the calibration method may include printing on the medium based on a second ejection condition corresponding to the second virtual print result while printing on the medium based on a first ejection condition corresponding to the first virtual print result.

According to this method, printing based on the second ejection condition is performed while printing based on the first ejection condition is performed. Therefore, the time required for printing can be shortened compared with when printing based on the second ejection condition is performed after printing based on the first ejection condition is completed.

What is claimed is:

1. A calibration method comprising:

acquiring medium information relating to a medium on which printing of an image is to be executed by liquid ejected in a droplet state;

specifying a type of the medium by collating the acquired medium information with structure data, the structure data being data relating to structure models of the medium corresponding to each of a plurality of types of the medium;

executing a first simulation of changing, at least once, at least one of a plurality of physical property conditions, which are conditions relating to a physical property of the liquid;

ejecting the liquid onto the medium with respect to the structure model corresponding to type of the specified medium;

capturing a post image of the medium after ejecting the liquid onto the medium;

acquiring permeation information relating to a permeation state of the liquid ejected onto the medium by analyzing the post image, wherein the permeation information includes a trace formed on a surface of the medium when liquid droplets deposited to the medium permeate into the surface of the medium;

estimating the physical property condition of the liquid by collating the acquired permeation information with results of the first simulation;

executing, based on the estimated physical property condition, a second simulation of changing, at least once, at least one of ejection conditions relating to ejection of the liquid; and displaying, based on results of the second simulation, a plurality of virtual print results, which are virtual print results when printing is performed on the medium based on each of the ejection conditions.

2. The calibration method according to claim 1, further comprising:

acquiring target image data, which is data of a target image;

collating the target image data with the plurality of virtual print results; and based on collation results between the target image data and the plurality of virtual print results, displaying the plurality of virtual print results in order of closeness to the target image data.

3. The calibration method according to claim 1, further comprising:

acquiring target image data, which is data of a target image;

collating the target image data with the plurality of virtual print results; and displaying an evaluation index based on a difference between the target image data and each of the plurality of virtual print results in association with each of the plurality of virtual print results.

4. The calibration method according to claim 1, wherein the physical property condition includes at least one of a viscosity property of the liquid, a contact angle of the liquid with respect to the medium, and a surface tension of the liquid.

5. The calibration method according to claim 1, wherein the ejection condition includes at least one of droplet diameter, droplet volume, droplet weight, droplet ejection speed, and deposit pattern.

6. The calibration method according to claim 1, wherein the plurality of virtual print results include a first virtual print result and a second virtual print result, and the calibration method further comprises printing on the medium based on a second ejection condition corresponding to the second virtual print result while printing on the medium based on a first ejection condition corresponding to the first virtual print result.

7. The calibration method according to claim 1, wherein the permeation information includes at least one of a size, a shape, and a depth of the trace.

* * * * *